United States Patent [19]

Deter

[11] Patent Number: 5,864,432
[45] Date of Patent: Jan. 26, 1999

[54] DEVICE FOR SHOWING A FIRST IMAGE IN A SECOND IMAGE WHICH IS VISIBLE THROUGH A TRANSPARENT SHEET

[75] Inventor: Christhard Deter, Gera, Germany

[73] Assignee: LDT GmbH Co. Laser-Dispaly-Technologie KG, Gera, Germany

[21] Appl. No.: 849,586

[22] PCT Filed: Sep. 13, 1996

[86] PCT No.: PCT/EP96/04041

§ 371 Date: May 29, 1997

§ 102(e) Date: May 29, 1997

[87] PCT Pub. No.: WO97/16757

PCT Pub. Date: May 9, 1997

[30] Foreign Application Priority Data

Oct. 27, 1995 [DE] Germany .................. 195 40 108.5

[51] Int. Cl.⁶ .................. G02B 27/14; G09B 5/00
[52] U.S. Cl. .................. 359/634; 359/630; 345/7
[58] Field of Search .................. 359/630, 631, 359/633, 634, 632; 345/7; 340/980

[56] References Cited

U.S. PATENT DOCUMENTS

| | | | |
|---|---|---|---|
| 3,533,104 | 10/1970 | Habegger et al. | 343/6 |
| 4,740,780 | 4/1988 | Brown et al. | 345/7 |
| 4,973,132 | 11/1990 | McDonald et al. | 359/630 |
| 5,066,102 | 11/1991 | Hirano | 359/630 |
| 5,157,549 | 10/1992 | Suzuki et al. | 359/633 |
| 5,162,928 | 11/1992 | Tamoguchi et al. | 359/13 |
| 5,194,989 | 3/1993 | Ferrante et al. | 359/583 |
| 5,200,844 | 4/1993 | Suvada | 359/40 |
| 5,486,840 | 1/1996 | Borrego et al. | 345/7 |
| 5,502,456 | 3/1996 | Korenaga et al. | 345/9 |
| 5,566,025 | 10/1996 | Knoll et al. | 359/630 |
| 5,576,886 | 11/1996 | Ferrante | 359/630 |

FOREIGN PATENT DOCUMENTS

| | | |
|---|---|---|
| 0210088 | 6/1986 | European Pat. Off. . |
| 202 460 | 11/1986 | European Pat. Off. . |
| 0312094 | 4/1989 | European Pat. Off. . |
| 0416222 | 6/1990 | European Pat. Off. . |
| 515 175 | 11/1992 | European Pat. Off. . |
| 2 633 067 | 2/1978 | Germany . |
| 3101854A1 | 12/1983 | Germany . |
| 3101854C2 | 12/1983 | Germany . |
| 3328226A1 | 2/1985 | Germany . |
| 3523032A1 | 2/1986 | Germany . |
| 3523032C2 | 2/1986 | Germany . |
| 3532120A1 | 3/1987 | Germany . |
| 3532120C2 | 3/1987 | Germany . |
| 3532301A1 | 3/1987 | Germany . |
| 8715025.5 | 3/1988 | Germany . |
| 3701359A1 | 7/1988 | Germany . |
| 3712663A1 | 10/1988 | Germany . |
| 3 908 300 | 9/1989 | Germany . |
| 3 822 222 | 1/1990 | Germany . |

(List continued on next page.)

OTHER PUBLICATIONS

Optoelectronics Devices and Technologies, Jun. 1991, Tokyo, Japan—Article "Miniature Virtual Disply Implement" B. Wells (pp. 155–162).

*Primary Examiner*—Georgia Epps
*Assistant Examiner*—Ricky Mack
*Attorney, Agent, or Firm*—McAulay Nissen Goldberg Kiel & Hand, LLP

[57] ABSTRACT

In a device for showing a first image in a second image which is visible through a transparent sheet at which light proceeding from the first image is reflected and which is so arranged that the first image and the second image are detectable by an observer at the same viewing angle, at least one light source is provided for substantially parallel light, by which the light proceeding from the first image as light bundle can be generated with little expansion.

12 Claims, 8 Drawing Sheets

FOREIGN PATENT DOCUMENTS

| | | |
|---|---|---|
| 3822222A1 | 1/1990 | Germany . |
| 69009158T | 6/1991 | Germany . |
| 4102678A1 | 8/1991 | Germany . |
| 4116043A1 | 11/1991 | Germany . |
| 4116903A1 | 12/1991 | Germany . |
| 4126148A1 | 2/1992 | Germany . |
| 4227582A1 | 2/1993 | Germany . |
| 4242797A1 | 7/1993 | Germany . |
| 4320129A1 | 12/1993 | Germany . |
| WO 87/01211 | 2/1987 | WIPO . |

DEVICE FOR SHOWING A FIRST IMAGE IN A SECOND IMAGE WHICH IS VISIBLE THROUGH A TRANSPARENT SHEET

BACKGROUND OF THE INVENTION a) Field of the Invention

The invention is directed to a device for showing a first image in a second image which is visible through a transparent pane or sheet at which light proceeding from the first image is reflected and which is so arranged that the first image and the second image are detectable by the observer at the same viewing angle.

b) Description of the Prior Art

Devices of this kind can be used in aircraft and automobiles, for example. For this purpose, the second image represents, for example, the surroundings that are visible through the windshield. The first image, e.g., for flight operation, can be symbols which are displayed in the visual range or viewing area of the pilot via the windshield as virtual images serving as orientation aids for take-off and landing. The use of such devices also provides substantial advantages for other vehicles such as automobiles. For instance, by means of the first image, a symbol can be made visible representing the safe distance by which the driver of the vehicle can gage whether he is too close to a vehicle traveling in front of him. In so doing, it is possible to couple the apparent distance of this symbol with speed so that the vehicle operator can monitor whether or not an adequate safety distance is being maintained between him and the vehicle traveling in front of him.

Further, essential information from the display instruments can also be faded into the viewing area of the driver so that the driver has substantially better control over the vehicle than if he had to constantly glance back and forth between the environment and the dashboard, so that operating safety and driving safety are substantially improved.

There are a great many suggested systems for such devices which are also known as "Head-Up Displays" (HUD). From these suggested systems there arises the important fact that, in order to reduce fatigue, the information of the first image, as virtual image, is formed so that no accommodation of the eye is required while the eye is adjusted to distant vision. In order to form an image as a virtual image at a great distance, the object representing the first image, e.g., a liquid crystal display (LCD), is brought between the focal point and the first lens vertex of an imaging system.

Over the past twenty years, a large number of protective rights have been claimed worldwide for HUDs for motor vehicles. In Europe, however, these systems are still in the developmental and testing stage. In this connection, a distinction is drawn between systems with holographic optics and those without holographic optics. An overview of the former systems can be found, e.g., in the article "Holographic Applications in Avionic HUDs", Woodcock and Kirkham, Military Technology Miltech (1985), page 6.

In systems without holographic presentation such as those known from EP-A-0 202 460 or U.S. Pat. No. 4,740,780, imaging optics are either dispensed with entirely or conventional glass optics, e.g., according to GB 2 203 855 A, are used to generate a virtual image by means of an image generator. In the most elementary systems, the information which is displayed as a first image on a hidden LCD is simply projected on the windshield of a vehicle. An advantage in these HUDs consists in that the driver need not change his viewing direction to detect the displayed information; however, in order to read, the driver must adjust his eyes to the short distance to the windshield. The changing accommodation of the eye to distance vision for viewing the surroundings and to the windshield leads to fatigue and accordingly to lowered response time especially in older drivers.

In systems with virtual image display several meters in front of the windshield, the relaxed eye can read the information at any time; unnecessary fatigue is thus avoided. However, due to the reflection of light on the aspherically curved windshield, especially with virtual image display, imaging aberrations occur which must be corrected by specially computed optics. As can be gathered from DE 26 33 067C2, the production and computation of these compensatory optics is very involved and difficult with respect to manufacturing tolerances. Because of the large space requirement of conventional optical systems, integration problems also occur.

The following questions in particular must be answered as regards the use of HUDs in vehicles:

How great is the space requirement for a system and can this system be integrated in a vehicle?

Can the vehicle supply sufficient output to power the light source and image generator?

How high are production costs?

These questions must be taken into account already in the design stage. Two HUDs of very different design will now be described:

The first system, developed by Holtronic GmbH Ottersberg in association with BMW, Munich, dispenses with a separate combiner, as it is called, in the windshield to combine the first and second images so as not to impair the driver's clear view of the outside environment. This system is described, e.g., in DE 37 12 663A1. The imaging element can be a holographic optical element (HOE) in transmission operation (transmission HOE or T-HOE) which is integrated in the dashboard or instrument panel of the motor vehicle.

The essential structural component parts in this solution are a light source, an image generator and the T-HOE which carries out several functions. It directs the light beam in the desired direction on the windshield, generates an enlarged virtual image of the object at a distance of several meters in front of the windshield, and compensates for errors occurring as a result of the reflection of light on the windshield.

In this connection, there exist various possibilities for optical presentation of information. For virtual display of instruments or symbols intended to alert the driver of a defect in the electronics, for example, a stationary imaging plane is sufficient. With other information displays, e.g., the display of a position-dependent object, as in the safety distance indicator mentioned above, a variable distance display is useful. This can be realized in different ways.

With the use of holographic methods, stationary symbols can be displayed as three-dimensional images at various distances by means of a multihologram, as it is called. Such a hologram comprises a plurality of individual holograms which reconstruct the same object at different distances. However, an adjusting device is required for specifically illuminating each individual hologram. Imaging with a stereoscopic beam path, on the other hand, is a more elegant solution, since the image generation can be changed optionally. This method has been realized with the HUD mentioned above.

The spatial or three-dimensional image impression is created in the stereoscopic process by the binocular parallax when the left eye and right eye are presented with the respective slightly different aspect of an object. The spatial shift is achieved by generating two images of the display object from the respective visual angle of the eyes while taking into account convergence and the magnitude of the object. In so doing, the imaging plane (focal plane) remains stationary. Thus, the HUD is formed of two optical channels, each with an image generator. The information of each individual image enters the respective eye. The brain then allows the two partial images to melt together in an overall picture.

In principle, because of the possibility of variable display of information, there is demand for displays in which the symbols shown in the first image can be generated electronically. Picture tubes and LCDs are suitable for this purpose. However, picture tubes are not practical in automobiles due to high price and because of the voltage supply unit for generating high voltage. LCDs, on the other hand, are compact and relatively easy to drive or control and their voltage supply also does not pose a problem. Disadvantages are insufficient brightness, low contrast which is dependent on the wavelength and polarization of the scatter light, sensitivity to temperature, and low resolution capability.

The latter represents a major problem for use in a motor vehicle. At present, suitable LCDs have a pixel size of more than 0.3 mm. At a magnification factor of 50, the driver sees the pixel at a size of 15 mm. The spacing between the pixels is around 10% greater than the pixel itself. Therefore, the unwanted image of the pixel matrix is still clearly visible from a distance of 10 to 15 m. Only relatively large jumps in distance can be exactly displayed with this pixel size because, while the size of the symbols can be correctly generated, the jumps in distance of the symbols to be generated (lateral disparity) are particularly large because of the pixel size, especially at great distances. A compromise must be made, wherein the image has the correct magnitude at any apparent image distance, but the lateral disparity can be correctly adjusted only for specified distances because of the low resolution. As regards the use of LCDs for this system in the automotive field, it may be concluded that resolution power, contrast and temperature stability would have to be improved.

The T-HOEs mentioned above have the characteristic of dividing white light into its spectral components. Imaging via a T-HOE with irradiation by white light would lead to blurring of the image due to such chromatic aberrations. These chromatic aberrations can be compensated in a wavelength region of around 100 nm by combining a plurality of HOEs; but if only one HOE is used, this results in the requirement for a narrow-band light source with an unrealistic requirement of $\Delta\lambda < 10$ nm. Further, the light source would have to possess the highest possible brightness or luminance to allow the observer still to detect the display against a bright real background. The required luminance of the light source can be determined from the luminance at the position of the observer and from the efficiency of the optical system.

Another factor determining the suitability of a light source is its size and optical output. Light sources consuming 100 W or more are impractical not only because of the high output, but also because of high heat generation. Moreover, a light source may not have a long delay time (t <10 s) between the controlling or triggering phase and operating phase so that warning symbols can be displayed in the most direct manner possible.

The article "Windshield with Holographic Mirror for Head-Up Displays", W. Windeln and M. A. Beeck, Auto-mobiltechnische Zeitschrift 91 (1989), pages 538–342, mentions another system which was developed by Volkswagen AG, Wolfsburg, in association with Vereinigten Glaswerke GmbH, Aachen. This system uses a holographic combiner which is integrated in the windshield. The desired information is generated on an LCD and appears with the help of an imaging lens with a stationary display plane. A high degree of efficiency is achieved in the overall system through the use of a combiner. As was described above, the requirements imposed on a combiner (high transmission, high efficiency, high reflection factor, low spectral bandwidth and good imaging quality) can only be met by a holographic combiner. At present, the only suitable holographic storage medium is dichromate gelatin (DCG) which has also been used in aircraft for many years. Photopolymers represent another material which might also be useful for this purpose. The photopolymers offered by Polaroid, Offenbach (with wet development) and Du Pont, Wilmington, U.S.A., are particularly notable. The latter do not require an involved wet development process with toxic chemicals. After a simple diffuse post-exposure and subsequent heat treatment, the hologram is fully developed and fixed. However, photopolymers are still in the developmental phase, i.e., are not yet commercially available.

A majority of development efforts is focussed on the industrial manufacture of the combiner and its integration into the windshield.

In principle, the distortion of the virtual light image can also be corrected by the combiner. A narrow-band green phosphor serves as a light source for the display and, in combination with the combiner, suppresses chromatic imaging errors.

The solutions known from the prior art have the following fundamental drawbacks: the required luminance in the viewing field of the vehicle operator is not achieved by LCD displays or rear-illumination displays or even cathode-ray tubes because the arrangement must also be operable under glaring sunlight. Further, the holograms used to mirror the display element in particular possess the very unpleasant quality that they appear when illuminated with broadband light in the visible spectrum and in rainbow colors.

For the purpose of increasing the light intensity, it is proposed in DE 38 22 222 A1 to arrange polarizing filters on the inside of the windshield and to reflect the first image directly via an optical system as a virtual image on the windshield. In this way, glaring sunlight, for example, can be damped so that the first image is more visible. Further, these polarizing filters have the advantage that double images and distracting reflections on the windshield are prevented or at least reduced. However, experience has shown that this solution also does not provide sufficiently high light intensity for the first image with simultaneous visibility of the bright second image.

OBJECT AND SUMMARY OF THE INVENTION

Therefore, it is the primary object of the invention to provide a device of the generic type in which the first image has sufficient luminosity in relation to the second image. In so doing, a simpler and more economical construction will also be made possible.

This object is met, proceeding from a device of the type mentioned above, by providing at least one light source for substantially parallel light by which the light proceeding from the first image can be generated with little expansion.

The invention dispenses with a holographic combiner that causes bothersome rainbow colors and impaired resolution. The first image and second image are simply combined on a sheet, e.g., a windshield. This is economical and also enables a clear display of the first image.

This results in an arrangement similar to that known from DE 38 22 222 A1. However, it differs from this substantially as a result of the light source with substantially parallel light which guarantees that all of the generated light output can be reflected in the direction of the driver via the sheet. A polarizing device is no longer absolutely necessary.

Due to the slight expansion, according to the invention, of the light emanating from the first image, the light bundle is also only detectable by the driver within an area in which he can move his head; light reflections and light phenomena bothersome for the drivers of other vehicles or for passengers are accordingly eliminated.

In view of this, it is clear that the expansion of the light bundle, possibly after transmission by one or more optical systems in the area of the driver, should be, at most, in the range of 30 to 50 cm so that, on the one hand, the first image is easily detectable regardless of the position of the driver's head and, on the other hand, the expansion of the light bundle is slight enough that it reaches the driver at optimum light intensity. In practice, good results were obtained with a beam expansion of less than ±7°.

In a preferable further development of the invention, segments are provided for emitting the slightly expanded light bundle or for reflecting or transmitting the light from the light source, of which there is at least one, these segments being controllable with respect to emission, transmission and reflection for forming the first image.

By means of such segments, the information for generating the first image is impressed on the small-expansion light bundle or light bundles. There are several possibilities for this purpose. In the first advantageous possibility, the segments themselves emit the light bundle. The segments can preferably be designed as laser diodes for this purpose. These laser diodes generate the substantially parallel light bundle, according to the invention, with a suitably high intensity so that the projected first image stands out sufficiently from the second image. Another preferred possibility for impressing the information of the first image for forming the parallel light of the light source by means of reflection or transmission similarly enables a high intensity of the first image in comparison with the second image, wherein different image contents can also be presented due to the controllability of the segments.

The segments could be designed as seven-segment displays, for example, for displaying numerical information. However, in a particularly advantageous further development of the invention, the segments are arranged in the form of a matrix. Substantially greater information densities can accordingly be exploited and used, e.g., for showing graphics in the first image.

In a preferred further development of the invention, transmission can be used in a particularly advantageous manner when the matrix is an LCD matrix.

Similar advantages to those of transmission can also be achieved when one or more mirrors are provided which reflect the light bundle generated by the light source, of which there is at least one, for forming the image. It is particularly advantageous when the light bundle generated by the light source, of which there is at least one, can be directed in its entirety to the sheet or windshield by means of reflection, wherein light losses caused by a polarization in the LCD matrix, for example, are prevented. The light intensity is accordingly likewise increased in a simple manner.

In accordance with an advantageous further development of the invention, the cost for mirrors can be kept especially low by providing two mirrors by which the light bundle can be deflected in two directions.

The outlay for image generation is sharply reduced compared, for instance, with a pixel matrix formed of mirrors. Further, the light intensity of the overall light bundle is available in its full intensity because the first image is generated by a deflection thereof.

This advantage makes itself particularly noticeable in a preferred further development of the invention in which the mirrors can be adjusted independently from one another with respect to angle by means of a deflecting device by which the first image can be displayed as vector graphics. In vector graphics, only those points which are to be detectable as illuminated points are scanned. Blanking times are reduced to a minimum so that practically the full light intensity of the primary light source is used to display the first image.

Another preferred further development of the invention provides a deflecting device by means of which the light bundle emanating from the light source, of which there is at least one, can be raster scanned in two directions and a control arrangement by means of which the intensity of the light bundle can be controlled.

This makes use of imaging via a uniform raster as is known, for example, from television picture projection. In this way, particularly good pictures can be displayed, which enhances the driving experience and also leads to increased driving safety.

The deflection can be carried out, for example, by means of acousto-optical modulators. But the advantages of the aforementioned further development of the invention resulting from deflection of the light bundle via two mirrors can be made use of. Therefore, it is provided in a preferred further development of the invention that one of the mirrors is a polygon mirror rotating at uniform rotational speed so that very rapid deflections can be realized and flickering of the image is prevented. Further, owing to the inertia of the rotating mirror, there are only slight synchronization errors, which brings about considerable advantages above all when used in motor vehicles in which the device is also subject to shocks and vibrations.

The above-mentioned advantages of the invention and its further developments can be achieved in a particularly economical manner by means of another preferable embodiment of the invention in that the light source, of which there is at least one, is an LED with a parallelizing and collimating optical system. In relation to the other dimensions in the motor vehicle, an LED can be considered substantially punctiform so that the requirements for expansion can be met in a simple manner by means of such an optical system without an appreciable reduction in intensity due to light losses resulting from collimation.

Possible losses due to collimating can even be completely avoided if at least one of the light sources is a laser. A laser generates a highly parallel beam from the outset which fully satisfies the requirements respecting expansion.

In a preferred further development of the invention, the laser is a laser diode or contains a laser diode as a pump source. Laser diodes generate a high light output at substantially lower voltages than those of an automobile battery. Accordingly, no elaborate electronics are required such as a high-voltage supply as when using a gas laser.

High intensities can be achieved in particular in accordance with an advantageous further development if the laser is a diode-pumped solid state laser. According to another preferred further development of the invention, frequency conversion devices are also provided for the diode-pumped solid state laser. Due to the devices for frequency conversion, it is always possible to select a wavelength, e.g., in the green region, where the sensitivity of the eye is very high or in the red region which is always interpreted by people as a warning, without being substantially limited in the selection of diode-pumped solid state lasers with respect to high intensity. Because of these features, particularly high light intensities can be achieved economically for the primary light source.

According to another preferable further development of the invention, the light emanating from the first image is polarized. For this purpose, in accordance with another further development of the invention, at least one polarizing filter can be provided or a laser emitting polarizing light can be used. The advantages of using polarized light are also clear, above all, from DE 38 22 222 A1 which was already described above. In this case, however, in contrast to the invention disclosed therein, the light source itself is polarized, so that due to additional polarization for reducing reflections or for damping the light of the second image no light losses occur for the first image with a corresponding adjustment of the polarizing direction.

The advantage of using polarized light is especially noticeable in a further development of the invention in which the light source is so arranged that the light emanating from the first image impinges on the sheet or windshield at an angle roughly corresponding to the Brewster angle. In the Brewster angle, the polarized light is completely reflected so that the full intensity of the substantially parallel light bundle is available to the operator of the vehicle for observing the first image. The light intensity is accordingly optimal without needing to provide additional polarizers, e.g., at the reflecting sheet.

Similar advantages to those afforded by polarizers are given in a preferable further development of the invention when the sheet is provided with a film on which the first image can be completely reflected, since the full intensity emanating from the first image is also available in this case at the vehicle operator position for detecting the first image.

This can be realized in a particularly simple manner, in accordance with a preferred further development of the invention, when the film is a dielectric layer or contains a dielectric layer and fully reflects the first image. Dielectric layers for full reflection are known from the prior art, for example, for anti-reflection coats for lenses. However, whereas high transmission is aimed for in anti-reflection coating of lenses, it is noted in the present case that the layer thicknesses are so dimensioned, in view of the optical parameters of the film material, that maximum reflection occurs. In this connection, it is useful in particular that for an individual wavelength of the first light such as is given, e.g., when using a laser, it is necessary to provide only one individual dielectric layer whose thickness at the angle of incident light is so selected that transmitted rays cancel each other out through interference.

The advantage of reflecting films can also be realized in a particularly simple fashion when the light proceeding from the first image is polarized and, according to an advantageous further development of the invention, the film on the sheet is a polarizing film or contains a polarizing partial layer.

In another preferred further development of the invention, the film is applied to the side of the sheet remote of the second image. In this way, double images caused by different reflections on the front and rear of the sheet such as would occur if the film were applied to the side remote of the first image are advantageously avoided. Accordingly, the image is shown particularly clearly, so that the light intensity of the first image is also optimized for the observer due to this further development. The clearer imaging also reduces the burden on the driver so that driving safety is increased due to reduced fatigue.

According to a preferred further development of the invention, the film is a composite of a plurality of individual layers. When a plurality of individual layers are provided, the reflectance behavior can be tailored to a broad wavelength spectrum of the light source. Composites, e.g., in the composite glass of a windshield, are particularly economical with respect to manufacturing techniques.

In another preferred further development of the invention, the film is so configured that it allows the light of the second image to pass through without hindrance. Thus, there is no impairment of visibility of the surroundings for the driver. This is particularly advantageous for night driving in which safety is impaired in any case due to poor light conditions. Therefore, precisely for this purpose, there should be no damping of the incident light from the surroundings by the additional film.

The sheet which has been mentioned a number of times in the preceding can be the windshield itself, for example. In general, however, due to design decisions and in the interest of the lowest possible air friction losses during driving, the shape of the windshield is curved, so that the first image must generally be corrected for the distortion resulting from this curvature. These distortions can be combatted, for example, by suitable display of the first image.

According to a preferred further development of the invention, a special sheet is provided which is arranged in a vehicle between a windshield and the vehicle operator's position. Accordingly, the shape of the sheet can be appropriately dimensioned for showing the first image. In particular, a plane sheet is advantageously economical, since no special manufacture is required.

It is particularly advantageous to effect the arrangement between the windshield and the vehicle operator's position because possible unwanted reflections or light losses on the windshield can be prevented. Further, the sheet is also located in the interior of the vehicle. This has the further advantage that weather conditions do not affect vision. Condensation from mist or adhering rain droplets, on the other hand, could severely impair the visibility of the first image if the sheet were arranged on the outside of the vehicle.

In another preferred further development of the invention, the light source emits light bundles of three different wavelengths. Accordingly, color images can also be displayed in the first image so that the information content can be increased. But this also allows the information displayed in the first image to be designed in a particularly artistically pleasing manner. This enhances the driving experience and increases driving safety due to the reduced nervous strain brought about by additional information. Further, the color display makes it possible, for example, to display warning signals in red and static information in green, for example, which is pleasant for the driver. Also, the display indicating that the high beams are switched on, which must be blue light according to German regulations, is made possible without difficulty within the first image according to this further development.

In another preferred further development of the invention, an imaging optical system is provided between the sheet and the first image. An optical system of this kind can display virtual images at a great distance, which is especially advantageous, above all, for the adaptability or accommodation of the eye of the driver. In particular, a virtual image can be achieved at a great distance in a particularly advantageous manner in that the first image is imaged within the object-side focal length of the optical system.

The invention will be described more fully hereinafter by way of example with reference to the drawings.

DESCRIPTION OF THE PREFERRED EMBODIMENTS

Figure 1:
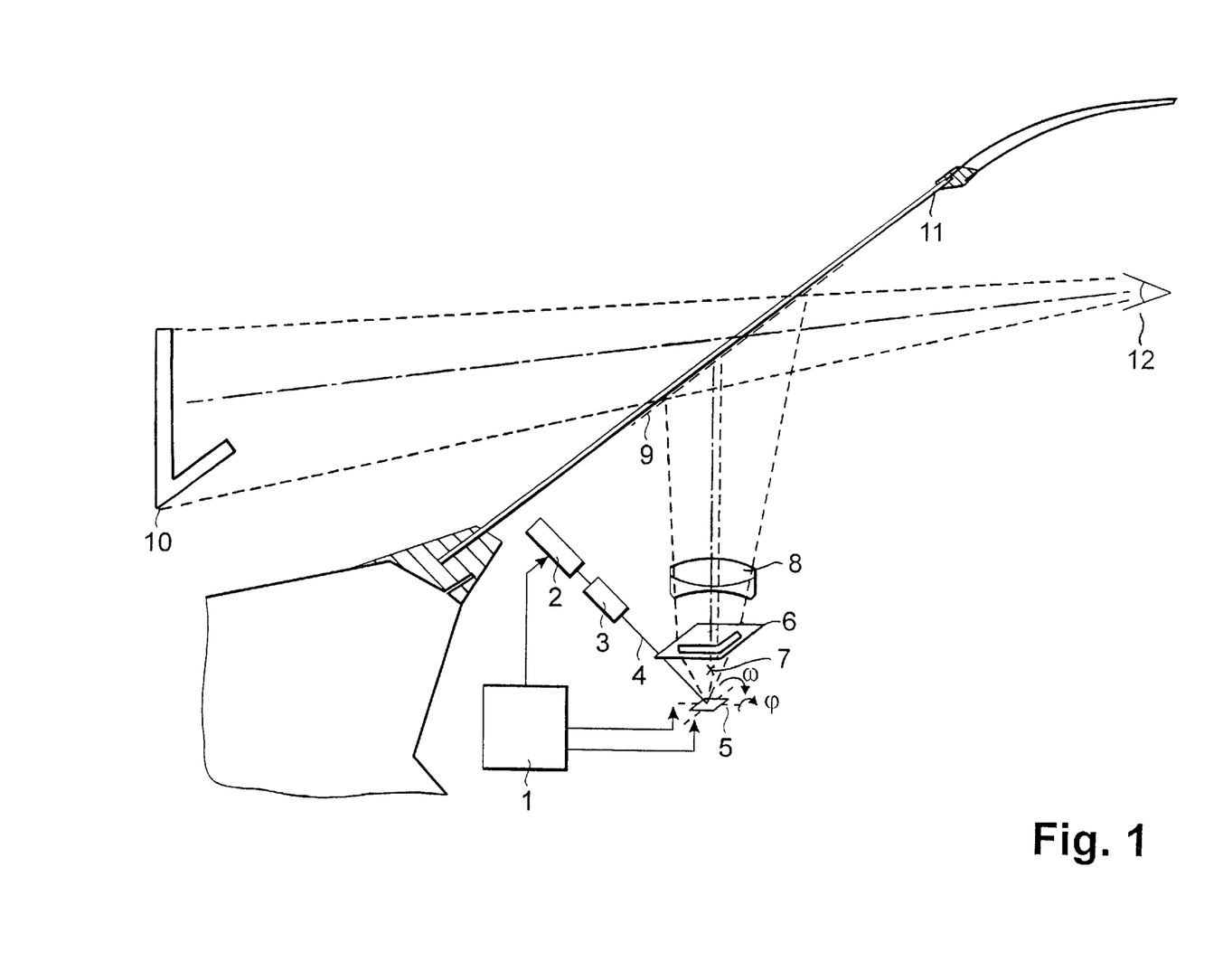
FIG. 1 shows an embodiment example according to the invention to illustrate essential attributes of the invention.

The device shown in FIG. 1 has a control arrangement 1 which generates the data required for symbol display. An output of the control arrangement 1 is connected with the input of control electronics 2 which drive or control a light source 3 for generating a substantially parallel light bundle 4. In the utility example, the light source was a diode-pumped solid state laser with frequency conversion for generating light with a wavelength in the maximum of visual sensitivity.

The substantially parallel light bundle 4 impinges on a mirror 5 from which it is reflected in the direction of a scatter sheet 6. The mirror 5 is swivelable about two axes for deflection of the light bundle. The corresponding angles of rotation are designated in FIG. 1 by $\omega$ and $\Phi$.

The swiveling movements executed at angles $\omega$ and $\Phi$ are likewise controlled by the control arrangement 1. Depending on the construction type of the control arrangement 1, images can be generated on the scatter sheet 6 in different ways with an arrangement of this kind. When the control arrangement 1 is constructed in such a way that the mirror 5 moves the light beam in a uniform raster scan over the scatter sheet 6 and the intensity of the light beam 4 is controlled by the control electronics 2, images can be displayed in a raster-scanning manner as is known e.g., from television technique with electron beams on the picture screen of a television picture tube.

However, in the embodiment example shown in FIG. 1, the intensity of the light bundle 4 was maintained constant, while a structure or pattern was projected onto the scatter sheet 6 with the help of movements of the mirror 5. The intensity of the light bundle is blanked only during the transition from one structure to another. The structures are imaged on the scatter sheet 6 in the form of vector graphics, for instance.

An optical system 8 with an object-side focal point 7 is provided for displaying the image on the scatter sheet 6 as a virtual image in the viewing area of the driver of a vehicle. The scatter sheet 6 lies within the focal length of the optical system 8. The light emerging from the optical system 8 subsequently impinges on a reflection film 9 so that the generated image is visible virtually at position 10. The reflection film 9 is arranged on the inside of the windshield 11 of a motor vehicle. An observer, whose eye 12 is shown schematically, then sees a virtual image 10 behind the windshield, in addition to the geographical surroundings located within the viewing area. Since the reflection film 9 is so designed that it reflects substantially only in wavelengths of the light source 3, the observer at position 12 can also have an unobstructed view of the surroundings and the virtual image at position 10 is included in this view.

Because of the substantially parallel beam of the light source 3, the area in which the virtual image at position 10 is clearly visible is substantially given by the scattering characteristics of the scatter sheet 6. This is so designed with respect to the scattering of the primary light bundle 4 that the image at position 10 can be favorably detected visually only in the area of typical head movements of the driver. It has proven advisable that the expansion of the substantially parallel light bundle should be at most in the range of 30 to 50 cm in view of the scatter sheet 6 and the optical system 8 following it. Accordingly, practically the whole light bundle 4 is directed to the driver in its full intensity. Light loss due to an excessive angular range is reduced to a minimum. In practice, good results have been obtained with an expansion of the light bundle less than or equal to $\pm 7°$.

If even higher light intensities in the vicinity of the eye 12 of the driver are required, the scatter sheet 6 can also be designed for even smaller angular divergences in the light bundle. However, it is advisable in this case to make the device adjustable with respect to position or to act upon the tilting direction of the mirror 5 via the control arrangement 1 with an adjustable dc voltage, so that the driver at position 12 can bring the virtual image 10 into the optimum region for the driver's head in order that the virtual image is always visible with optimum intensity for drivers of different sizes and different sitting positions.

It can also be seen immediately from the indicated variables for expansion that the parallelism of the light bundle 4 is not critical. Therefore, a high-intensity light-emitting diode can also be used, instead of a laser, as light source 3. Since the light in such structural components originates essentially at the barrier layer, they may be regarded essentially as a point light source whose output light bundle can be rendered parallel in an appropriate manner by means of a lens, a concave mirror and/or a collimator.

On the other hand, selecting a laser for the light source 3 also has advantages with respect to the reflection at the windshield 11. In the embodiment example, a linearly polarized light bundle 4 was generated with the indicated laser. The reflecting film 9 was formed as a polarizer whose linear polarization direction was selected in such a way that all of the light generated by the scatter sheet 6 was reflected in the region of the driver's head. In addition to achieving optimum light intensity, the polarization characteristics of the reflecting film 9 have the advantage that reflections are prevented on the windshield and the virtual image is thus more clearly visible.

However, if it is desirable to dispense with the reflecting film 9 in the interest of reduced cost in order to achieve high intensity, the device can also be arranged in such a way that the light bundle emerging from the optical system impinges on the windshield 11 roughly at the Brewster angle. As is well known, the reflectance of a polarized light beam is then at a maximum with a suitable polarizing direction. Accordingly, a film is no longer needed.

In FIG. 1, the windshield 11 is shown as a plane surface. The image 6 is accordingly imaged at position 10 without distortion. However, windshields are generally curved. The resulting distortion can be compensated for by the control arrangement 1 in that the image on the scatter sheet 6 is distorted in such a way that the distortions are canceled out by the mirror reflection in the windshield 11. However, this can cause the resolution to vary in different image areas of the virtual image at position 10.

But it is also possible, instead of this, to arrange a flat sheet between the windshield 11 and driver resulting in the same advantageous imaging characteristics as those in the flat windshield 11 which is shown schematically in the drawing.

However, the reflecting film 9 should be arranged on the driver's side regardless of whether it is applied to the windshield 11 or to a separate sheet, so that multiple reflections in the sheet itself will not generate further virtual images which could be found extremely bothersome.

Reflecting films can be constructed as thin films or dielectric mirrors, as they are called, such as are known from other applications in optics. When a large number of wavelengths are to be reflected by the films, it is advantageous to apply a composite formed of a plurality of individual layers which are adapted to the wavelength or wavelengths of the light source 3.

Figure 2:
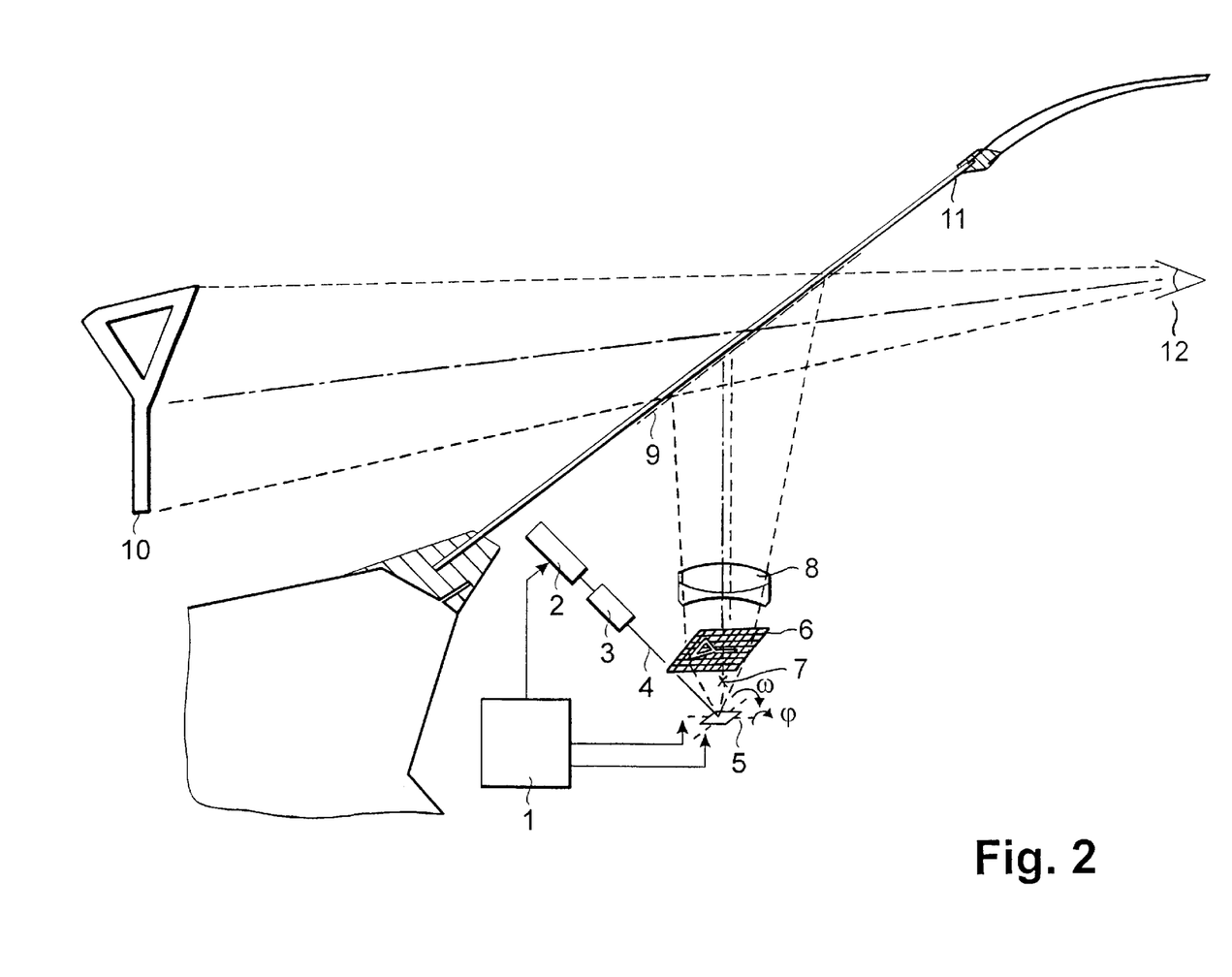
FIG. 2 is a schematic view of an embodiment example in which the first image is represented by a matrix on a scatter sheet.

FIG. 2 shows an embodiment example similar to that shown in FIG. 1, but in which the image display on the scatter sheet 6 is different. In FIG. 2, the image is generated as a rastered matrix as was already described above.

Yet another embodiment example can be described with reference to FIG. 2. When the light bundle 4 is correspondingly expanded, e.g., when the light source 3 is an LED with a parallelizing optical system, an LCD matrix can also be provided in place of the scatter sheet 6. Especially if the light bundle 4 is already polarized, practically all light can be allowed to pass at points with the same polarization as the light bundle 4 by means of the LCD matrix, whose image display relies in a well-known manner on different polarizing directions with voltages applied to different segments in the matrix.

Figure 3:
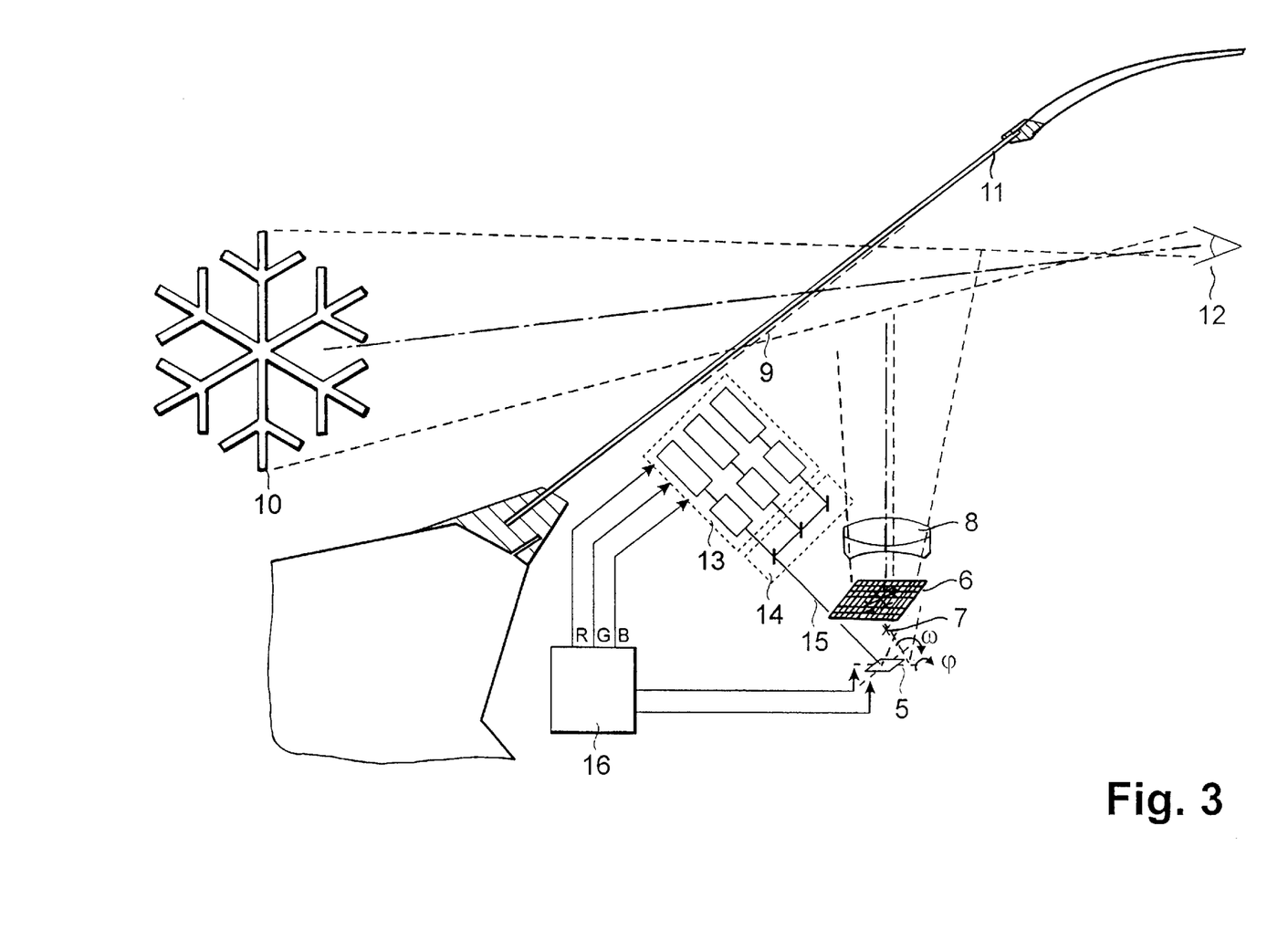
FIG. 3 is a schematic view of a first image in color.

FIG. 3 shows an example similar to that in FIG. 1. In the present case, however, the light source 3 is replaced by a light source 13. Three lasers with the colors red, green and blue are located within the light source 13. The light bundles emanating from the lasers are recombined into an individual parallel beam 15 by a beam combining device 14. The image generation is effected in a similar manner to that described in the embodiment examples of FIG. 1 and FIG. 2. For example, dichroitic mirrors can be arranged in the beam combining device 14 for combining the light bundles of different colors, as is known from laser television technology.

Figure 4:
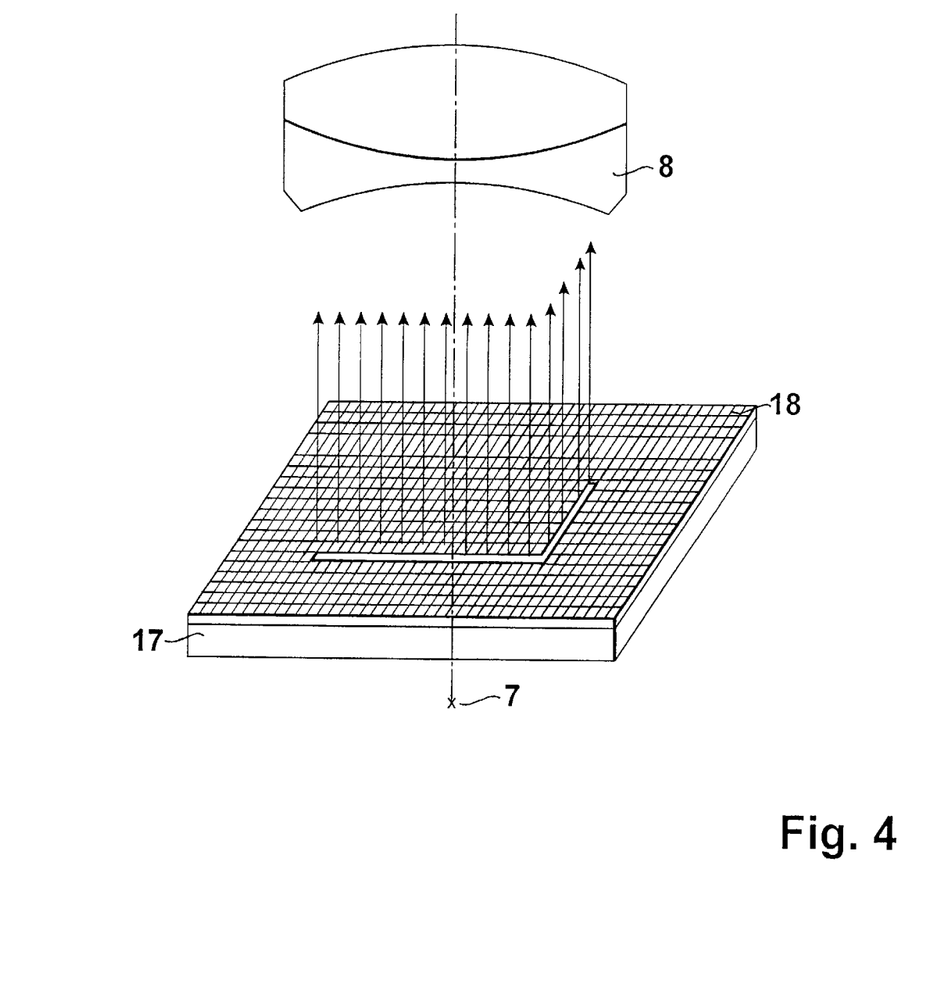
FIG. 4 shows an embodiment form with a matrix comprising laser diodes.

The embodiment example shown in FIG. 4 dispenses with an individual light bundle 4 or 14 and the deflecting mirror 5. Instead of the scatter sheet 6, a laser diode matrix 18 is arranged, according to FIG. 4, between the optical system 8 and the associated focal point 7. Image generation is effected by electrically activating the individual laser diodes at corresponding image points of the matrix.

In the embodiment example according to FIG. 4, control electronics 17 which control the light intensity of the individual laser diodes in the matrix are integrated together with the integrated matrix arrangement within the same component.

Figure 5:
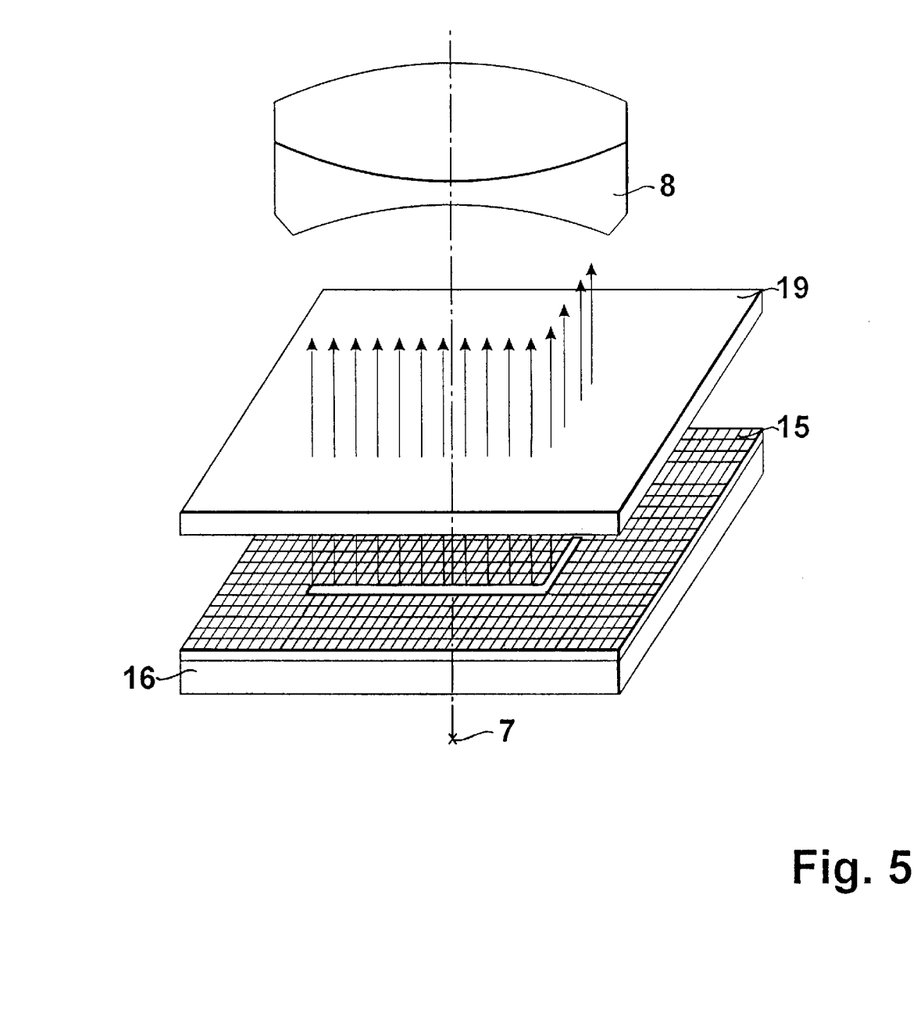
FIG. 5 shows an embodiment example with an LED array and a polarizing filter.

A similar embodiment example is also shown in FIG. 5. In this case, an LED matrix 15 with integrated control electronics 16 is provided in place of the laser diode matrix 18. In the embodiment example, the LED matrix was so selected that the expansion required according to the invention was given for maximum light intensity of the individual LEDs of the matrix based on the construction. In principle, however, LEDs can also be used if a foil or sheet on which small raised portions are formed as lenses fitting the LEDs is placed over such an LED matrix 15, these raised portions being dimensioned in such a way that the expansion of the emerging light bundles together with a change in the beam profile due to the optical system 8 is small enough that the essential component of light lies within the range made accessible by the head movements of the driver.

In an LED matrix 15, the advantages afforded by polarized light need not be forfeited if a polarizing filter 19 is arranged in the light path of the light bundles proceeding from the LEDs as is shown in FIG. 5. In the embodiment example in FIG. 5, this polarizing filter 19 is inserted between the optical system 8 and the LED matrix 15.

Figure 6:
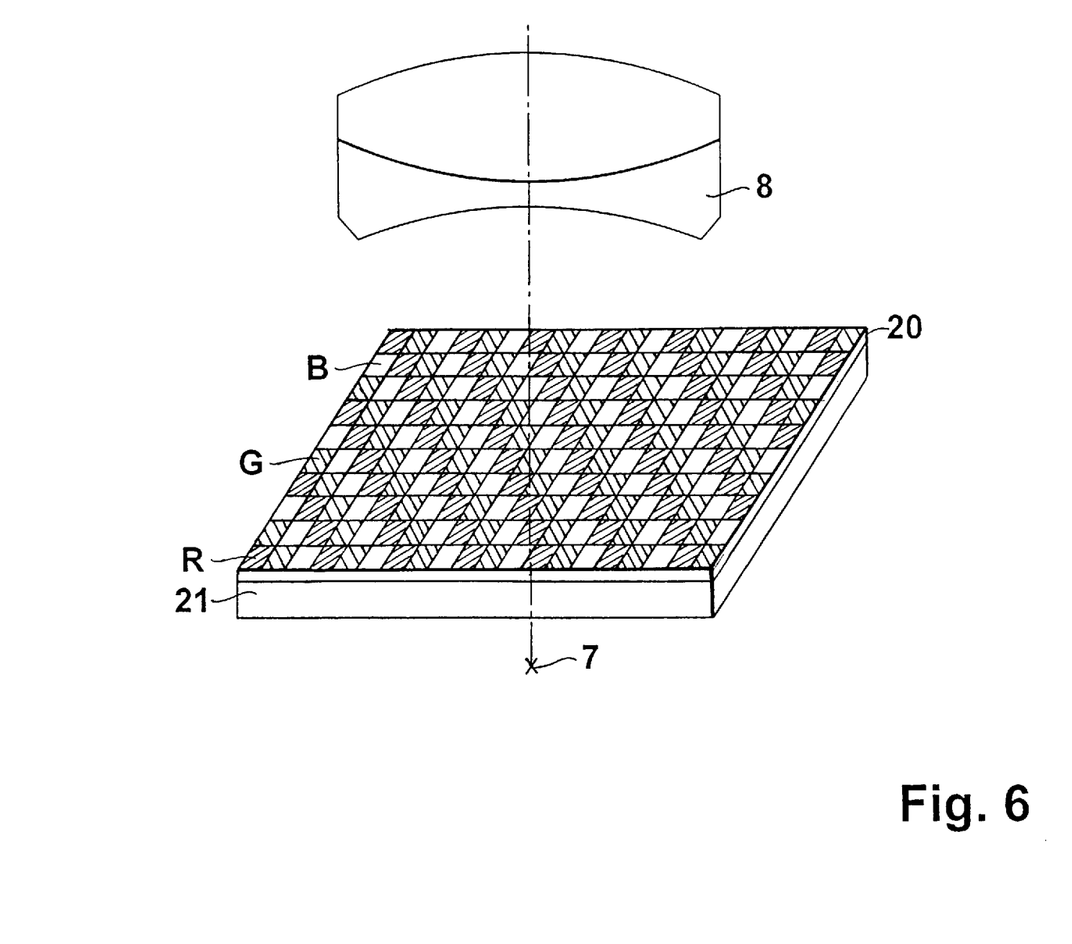
FIG. 6 shows a basic arrangement for a matrix for displaying a first image in color.

The LED matrix 15 and the laser diode matrix 1 8 can be referred to, in principle, as light source matrices. The embodiment example in FIG. 6 shows how such a light source matrix must be formed in order to achieve color images. In this instance, the light source matrix 20 which is integrated together with the control electronics 21 comprises different laser diodes or LEDs with different wavelengths designated by R, G, B corresponding to the designations R, G, B for red, green and blue picture elements in television. The LEDs are shown in FIG. 6 with different shading corresponding to their wavelengths. A possible arrangement of the different laser diodes or LEDs by means of which color images can be displayed is shown directly in FIG. 6.

Figure 7:
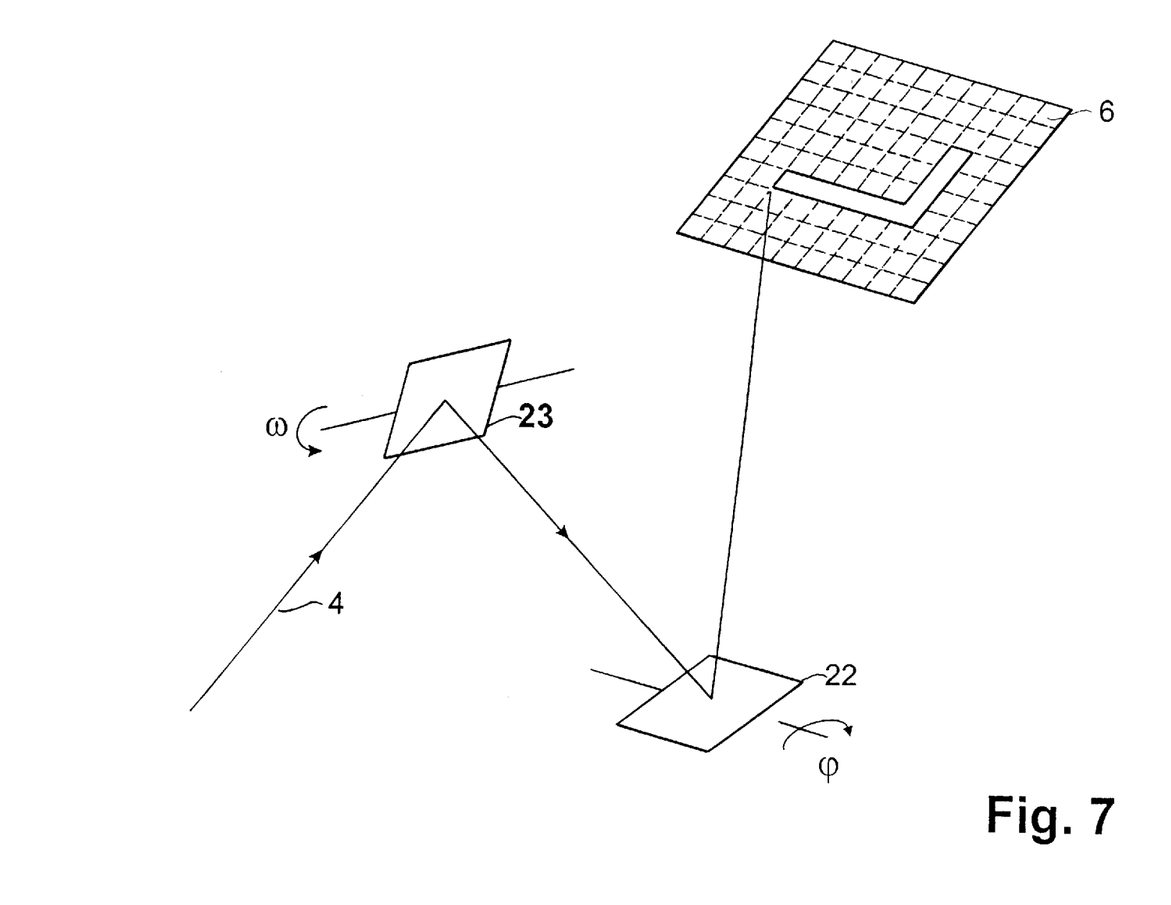
FIG. 7 is a schematic view showing image generation with two movable mirrors arranged one after the other in another embodiment example of the invention.

Instead of the mirror 5 according to the embodiment example in FIG. 1, two independent mirrors 23 and 22 can also be provided for the common tilting about two axes. An embodiment example of this kind is shown in FIG. 7. For uniform scanning, a polygon mirror can also be used instead of one of the mirrors 22 or 23 for line scanning. Polygon mirrors generally guarantee very uniform raster scanning due to their inertia.

Figure 8:
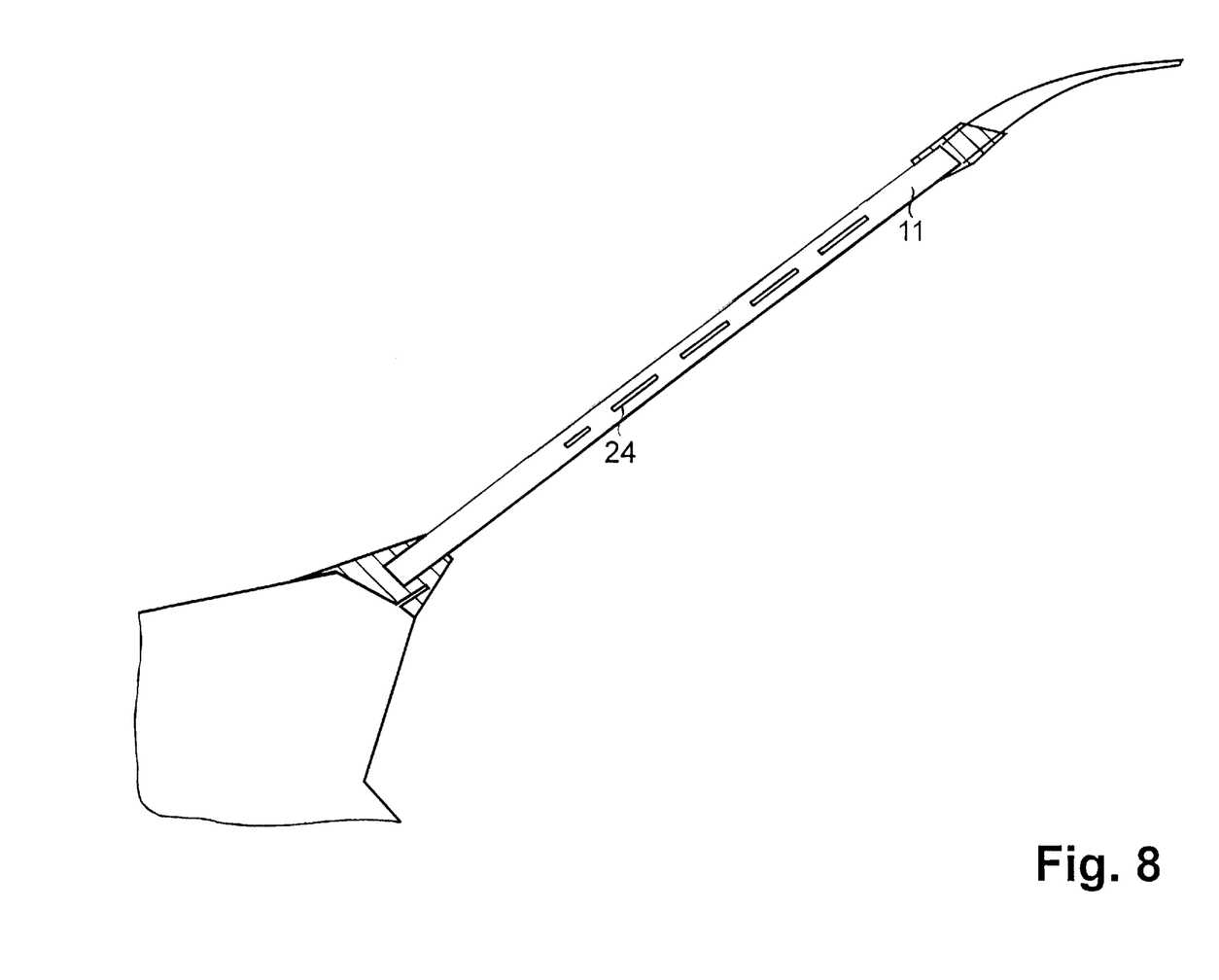
FIG. 8 shows a windshield with internal reflection films.

FIG. 8 shows another example in which the reflecting film 9 is not applied to the windshield 11 itself, but rather is integrated therein. Since the reflecting films mentioned above are primarily very thin films, installation of this kind in a composite glass 11 constructed as a windshield guarantees protection for the thin film 24 shown in FIG. 8. In this case, also, the film 24 can be constructed as a thin film for total reflection of the light bundle 3. Further, films reflecting in a polarization-dependent manner can also be used.

The preceding examples clearly show that the invention can be realized in many ways. For this purpose, an essential element consists in that maximum light intensity is generated because of the substantially parallel light bundle in the viewing area of the driver due to the slight expansion of the light bundle.

While the foregoing description and drawings represent the present invention, it will be obvious to those skilled in the art that various changes may be made therein without departing from the true spirit and scope of the present invention.

What is claimed is:

1. In a device for showing a first image in a second image which is visible through a transparent sheet at which light proceeding from the first image is reflected and which is so arranged that the first image and the second image are detectable by an observer at the same viewing angle, the improvement comprising that:

at least one light source is provided for substantially parallel light, by means of which the light proceeding from the first image as a light bundle is generated with an expansion that leads to an extension of the light bundle of less than 50 cm at a location of the observer's head and is larger than the size of the observer's head;

wherein segments are provided for emitting the expanded light bundle or for reflecting or transmitting the light from the light source, of which there is at least one, these segments being controllable with respect to emission, transmission or reflection for forming the first image, and wherein segments are arranged in the form of a matrix.

2. The device according to claim 1, wherein the segments are configured for transmission and the matrix is an LCD matrix.

3. In a device for showing a first image in a second image which is visible through a transparent sheet at which light proceeding from the first image is reflected and which is so arranged that the first image and the second image are detectable by an observer at the same viewing angle, the improvement comprising that:

at least one light source is provided for substantially parallel light, by means of which the light proceeding from the first image as a light bundle is generated with an expansion that leads to an extension of the light bundle of less than 50 cm at a location of the observer's head and is larger than the size of the observer's head;

wherein at least one mirror is provided which reflects the expanded light bundle generated by the light source of which there is at least one, for forming the image;

and at least one mirror is adjusted with respect to angle independently in two tilting directions by means of a deflecting device, so that the first image is displayed as vector graphics.

4. In a device for showing a first image in a second image which is visible through a transparent sheet at which light proceeding from the first image is reflected and which is so arranged that the first image and the second image are detectable by an observer at the same viewing angle, the improvement comprising that:

at least one light source is provided for substantially parallel light, by means of which the light proceeding from the first image as a light bundle is generated with an expansion that leads to an extension of the light bundle of less than 50 cm at a location of the observer's head and is larger than the size of the observer's head;

wherein a deflecting device is provided by which the light bundle proceeding from at least one light source is raster scanned in two directions, and a control arrangement is provided, by means of which the intensity of the light bundle is controlled.

5. The device according to claim 4, wherein the two mirrors are provided by which the light bundle is deflected in two directions and wherein one of the mirrors is a polygon mirror rotating at uniform rotational speed.

6. In a device for showing a first image in a second image which is visible through a transparent sheet at which light proceeding from the first image is reflected and which is so arranged that the first image and the second image are detectable by an observer at the same viewing angle, the improvement comprising that:

at least one light source is provided for substantially parallel light, by means of which the light proceeding from the first image as a light bundle is generated with an expansion that leads to an extension of the light bundle of less than 50 cm at a location of the observer's head and is larger than the size of the observer's head;

wherein at least one light source is a laser or contains a laser.

7. The device according to claim 6 wherein the laser is a laser diode or contains a laser diode as a pump source.

8. The device according to claim 6 wherein the laser is a diode-pumped solid state laser.

9. The device according to claim 8 wherein devices for frequency conversion are provided for the diode-pumped solid state laser.

10. In a device for showing a first image in a second image which is visible through a transparent sheet at which light proceeding from the first image is reflected and which is so arranged that the first image and the second image are detectable by an observer at the same viewing angle, the improvement comprising that:

at least one light source is provided for substantially parallel light, by means of which the light proceeding from the first image as a light bundle is generated with an expansion that leads to an extension of the light bundle of less than 50 cm at a location of the observer's head and is larger than the size of the observer's head;

wherein the light proceeding from the first image is polarized, and a light source of which there is at least one, is or contains a laser emitting polarizing light.

11. In a device for showing a first image in a second image which is visible through a transparent sheet at which light proceeding from the first image is reflected and which is so arranged that the first image and the second image are detectable by an observer at the same viewing angle, the improvement comprising that:

at least one light source is provided for substantially parallel light, by means of which the light proceeding from the first image as a light bundle is generated with an expansion that leads to an extension of the light bundle of less than 50 cm at a location of the observer's head and is larger than the size of the observer's head;

wherein the light proceeding from the first image is polarized, and the light source is arranged in such a way that the light emitted by the first image impinges on the sheet at the Brewster angle.

12. In a device for showing a first image in a second image which is visible through a transparent sheet at which light proceeding from the first image is reflected and which is so arranged that the first image and the second image are detectable by an observer at the same viewing angle, the improvement comprising that:

at least one light source is provided for substantially parallel light, by means of which the light proceeding from the first image as a light bundle is generated with an expansion that leads to an extension of the light bundle of less than 50 cm at a location of the observer's head and is larger than the size of the observer's head;

wherein the sheet is provided with a film on which the first image is completely reflected and the light proceeding from the first image is polarized, wherein the film is a polarizing film or contains a polarizing partial film.

* * * * *